United States Patent [19]
Rahn et al.

[11] Patent Number: 6,040,908
[45] Date of Patent: Mar. 21, 2000

[54] METHOD FOR STRESS TUNING FIBER OPTIC SENSOR COILS

[75] Inventors: John P. Rahn, West Hills; Ralph A. Patterson, Moorpark; Amado Cordova, Woodland Hills, all of Calif.

[73] Assignee: Litton Systems, Inc., Woodland Hills, Calif.

[21] Appl. No.: 09/123,626

[22] Filed: Jul. 28, 1998

[51] Int. Cl.[7] .................................................. G01C 19/72
[52] U.S. Cl. ............................................................ 356/350
[58] Field of Search ................................ 356/350, 73.1; 385/12

[56] References Cited

U.S. PATENT DOCUMENTS

| | | | |
|---|---|---|---|
| 5,329,349 | 7/1994 | Patterson et al. | 356/350 |
| 5,371,593 | 12/1994 | Cordova et al. | 356/350 |
| 5,546,482 | 8/1996 | Cordova et al. | 356/350 |
| 5,847,829 | 12/1998 | Corvoda | 356/350 |

*Primary Examiner*—Samuel A. Turner
*Attorney, Agent, or Firm*—Elliott N. Kramsky

[57] ABSTRACT

A method and apparatus for reducing the temperature-dependent Shupe bias of a potted gyro sensor coil pack to near-zero is provided by selectively adjusting the manner in which CCW and CW fiber leads are attached to the coil pack or the coil mount. The invention recognizes the inevitable existence of a strain differential between the CW and CCW-wound portions of a symmetrically-wound fiber coil. Leads affixed to the ends of the CW and CCW-wound halves of the coil are selectively bonded in accordance with principles for creating a counteracting temperature-dependent stress differential whereby temperature-dependent Shupe bias is substantially eliminated from the gyro output.

15 Claims, 2 Drawing Sheets

METHOD FOR STRESS TUNING FIBER OPTIC SENSOR COILS

BACKGROUND

1. Field of the Invention

The present invention relates to fiber optic gyroscopes. More particularly, this invention pertains to a method and apparatus for reducing the magnitude of Shupe bias by manipulation of fiber leads to correct stress imbalances within the coil pack.

2. Description of the Prior Art

FIG. 1 is a schematic view of a fiber optic gyroscope. It generally comprises a light source 10, a beamsplitter 12 (either a fiber optic directional coupler or an integrated-optics Y-junction), a fiber optic coil 14, a polarizer 16 (and sometimes one or more depolarizers) and a detector 18. A beamsplitter 11 between the light source 10 and the polarizer 16 insures that the configuration is reciprocal. Light from the light source 10 is split by the beamsplitter 12 into copropagating and counterpropagating waves travelling in the sensing coil 14. The associated electronics measures the phase relationship between the two interfering, counter-propagating beams of light that emerge from opposite ends of the coil 14. The difference between the phase shifts experienced by the two beams provides a measure of the rate of rotation of the platform to which the instrument is fixed.

Environmental factors can affect the measured phase shift difference between the counterpropagating beams, thereby introducing a bias or error. Such environmental factors include variables such as temperature, vibration (acoustical and mechanical) and magnetic fields. These factors are both time-varying and unevenly distributed throughout the coil, inducing variations in the optical light path that each counterpropagating wave encounters as it travels through the coil. The phase shifts induced upon the two waves are unequal, producing a net undesirable phase shift which is indistinguishable from the rotation-induced signal.

U.S. Pat. No. 5,329,349 of Ralph A. Patterson, et al. covering "Method for Tuning Fiber Optic Sensor Coils" ('341 Patent, property of the Assignee herein) teaches a method for addressing the bias errors that often persist as a result of the inevitable imperfections in applying well-known cancellation coil winding techniques such as quadrupole winding. In practice, bumps, wrinkles and various errors will invariably occur during coil winding. As a result of such errors, fiber segments equidistant from the coil midpoint may not be located in physical proximity (a requirement for an effective quadrupole winding). Winding errors are to be expected in view of the quite substantial task involved in the precise winding of a coil of, for example, one thousand meters of optical fiber. The above-referenced patent teaches that the results of such unavoidable winding imperfections, including time-dependent changes in fiber properties and bias effects can be addressed through the selective trimming of the end leads of the wound coil in response to observations (by means of test apparatus) of the coil's performance. According to theory, a Shupe bias point may be determined so that the Shupe bias error can be attributed to a difference in fiber lengths between that Shupe bias point and the ("CW" or clockwise and "CCW" or counterclockwise) ends of the coil. In theory, the trimming of the '349 Patent compensates for the fact that unequal lengths of optical fiber may exist between the Shupe bias point and the coil ends due to the above-described imperfections. By adjusting the lengths of the leads relative to one another, one effectively makes up or compensates for this asymmetry.

While the above lead trimming method will reduce bias errors, it is limited in effectiveness as it assumes that the Shupe bias error is the result of winding asymmetries alone and ignores other issues relating to the coil leads. The leads must be secured against the coil pack. Otherwise, very significant vibration-induced Shupe errors would be introduced. Unfortunately, the necessary anchoring of the coil leads introduces the factor of fiber stressing into the analysis of temperature-induced Shupe bias. Thus, this issue must necessarily be addressed to avoid the coil leads acting as a source of bias rather than a solution to such problem.

SUMMARY OF THE INVENTION

The present invention addresses and overcomes the preceding and other shortcomings of the prior art by providing, in a first aspect, a method for reducing Shupe bias in a fiber optic gyroscope. Such gyroscope is of the type that includes a source of optical energy, a coil pack comprising a potted sensor coil formed of fiber segments wound clockwise and counterclockwise from the midpoint of the coil. The coil pack is located upon and adjacent to a coil mount. A phase modulator is engaged to the coil for imposing an artificial phase shift upon light counterpropagating within the coil and a photodetector for receiving and converting the output of the coil into an electrical signal.

The method of the invention includes the step of applying a plurality of temperature ramps to the coil pack and measuring the output of the coil in response to each of such ramps. Then, the strain differential between the clockwise and counterclockwise-wound fiber segments is calculated and then a lead profile is determined for imposing a counteracting differential stress. Finally, fiber leads are attached to the ends of the counterclockwise and clockwise wound segments in accordance with the lead profile.

In a second aspect, the invention provides a mounted sensor coil for a fiber optic gyroscope. Such coil includes an optical fiber that is arranged into a plurality of layers of clockwise and counterclockwise turns from the midpoint of said fiber in accordance with a predetermined winding pattern. Such plurality of layers is potted with a first adhesive to form a coil pack. Fiber leads are fixed to the opposed ends of the wound fiber. The coil pack is located upon and adjacent to a coil mount comprising a central hub and at least one end flange to thereby form a mounted arrangement. The leads are bonded to the mounted arrangement.

The preceding and other features and advantages of the invention will become further apparent from the detailed description that follows. Such description is accompanied by a set of drawing figures. Numerals of the drawing figures, corresponding to those of the written text, point to the various features of this invention with like numerals referring to like features throughout.

DETAILED DESCRIPTION OF THE PREFERRED EMBODIMENT

Figure 1:
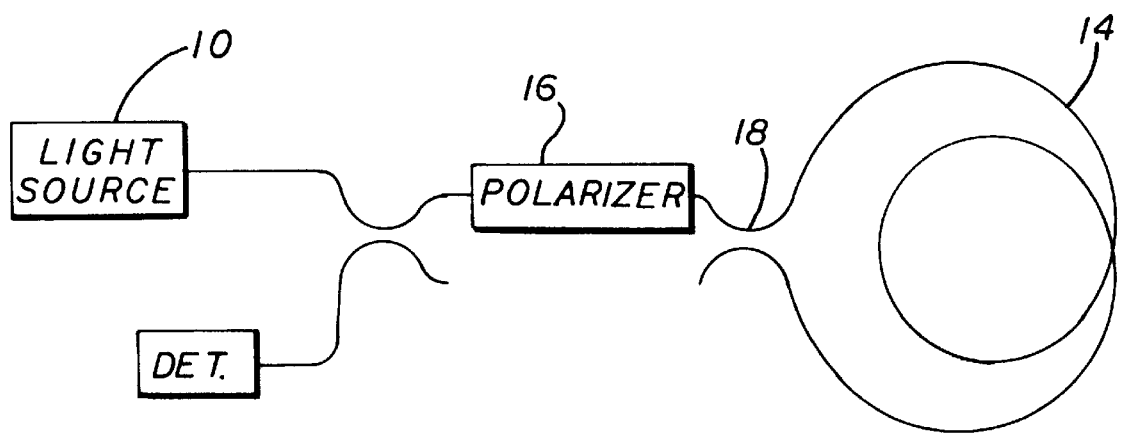
FIG. 1 is a generalized schematic view of a fiber optic gyroscope.
Figure 2:
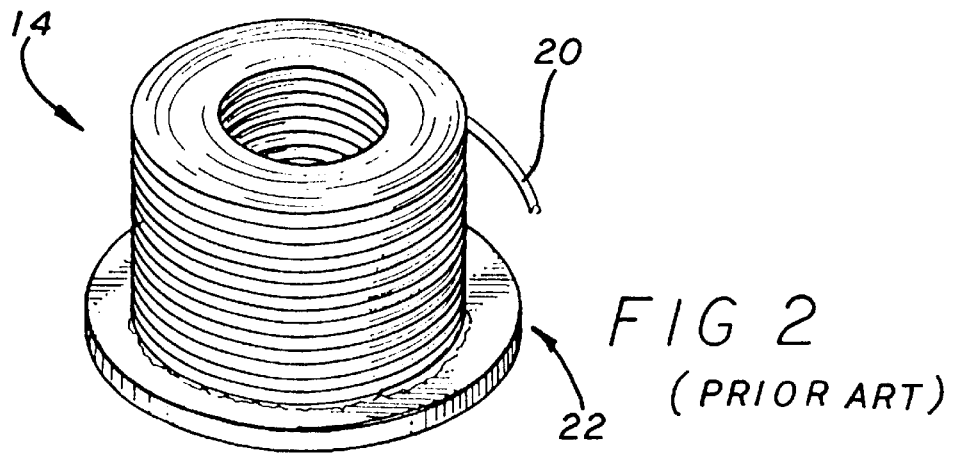
FIG. 2 is a perspective view of a sensor coil for a fiber optic gyroscope.

Turning to the drawings, FIG. 2 is a perspective view of a sensor coil 14 that provides a critical element of a fiber optic gyro system. In use, it is rigidly fixed to a platform whose inertial rotation rate is to be measured.

The sensor coil 14 comprises an optical fiber 20 that is shown wound upon a mandrel 22 that may include one or two end flanges. The coil 14 serves as an optical guide for receiving a counterpropagating beam pair emitted from a common light source (not shown). While the supportive mandrel 22 of FIG. 2 is of a type that possesses a single flange, a second, opposing flange may be present and this does not constitute an essential element of the invention.

As discussed above, the creation of a winding pattern that is symmetrical about the mid-point of the fiber 20 is quite beneficial in terms of reducing certain bias effects that can be traced to the gyro's operating environment. Symmetrical winding patterns, which minimize the Shupe effect, provide an advantageous starting point for the practice of the method of the invention. Winding patterns that preserve symmetry about the center of the fiber decrease those phase errors that are otherwise induced by changing thermal conditions. The influence of changing thermal gradients upon phase errors, known as the Shupe Effect, is discussed, for example by N. J. Frigo in "Compensation of Linear Sources of Non-reciprocity in Signal Interferometers", SPIE Proceedings, Fiber optic and Laser Sensors, Vol. 412 (Arlington Va., Apr. 5 through 7, 1983) at pages 268–271. The coil 14 (or potted coil pack), ideally with layers wound in a symmetrical pattern (e.g. quadrupole), preferably has the property that lengths of fiber 20 that are equidistant from the center of the mandrel are in close proximity and therefore affected to substantially the same degree by rapidly changing temperature or stresses. The temperature field needn't be symmetrical for the quadrature winding to work reasonably well. Because of winding symmetry, temperature gradients will be relatively symmetrical about the midpoint of the wound coil. It follows from this that, in such a case, phase errors due to the Shupe effect tend to cancel.

Figure 3:
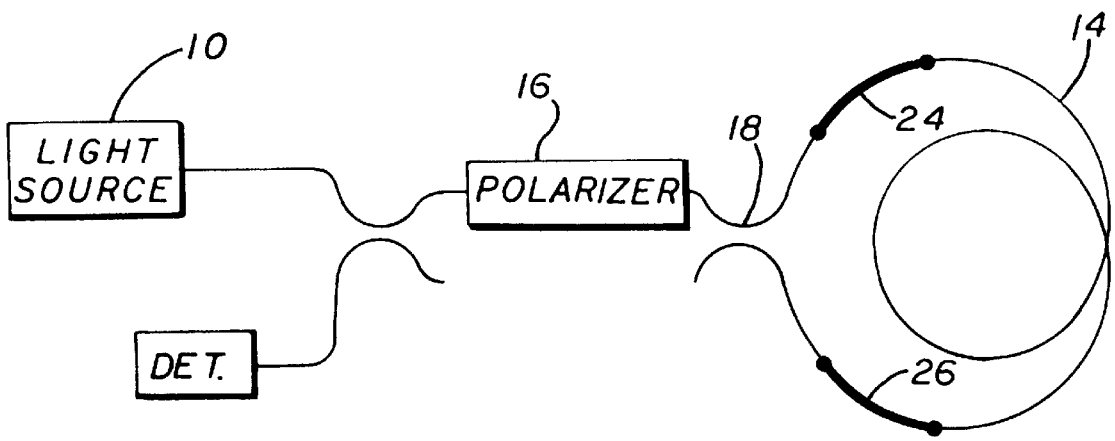
FIG. 3 is schematic view of a fiber optic gyro in accordance with U.S. Pat. No. 5,329,349.

FIG. 3 is a schematic view of a fiber optic gyro in accordance with the teachings of U.S. Pat. No. 5,329,349. As can be seen, leads 24, 26 are selectively spliced onto the ends of the potted coil 14 for the purpose of effectively balancing the lengths of fiber wound clockwise and counterclockwise from the midpoint of the symmetrically-wound coil. While this provides a correction to Shupe bias as addressed by symmetrical winding techniques, the inventors have found that this error is affected by the manner in which the leads 24, 26 are engaged or attached to the remainder of the gyro. Experiments have shown that, while adding an extra meter of free (unbonded) fiber to one of the leads of the coil increases the Shupe Tdot coefficient ("STDC", bias error as a function of temperature ramp rate Ṫ) by 0.09 deg/Hr/(deg C/min) ("DHCM"), when the same meter of fiber is bonded to an aluminum mandrel (Note: the coefficient of expansion of aluminum is about 20 ppm/deg C.), the average STDC change becomes 1.95 DHCM, a factor of 22 increase. These results are in reasonable agreement with the existing theory that predicts an STDC of approximately zero resulting from the addition of an unbonded meter of fiber and STDC of approximately 2.69 DHCM for the glass fiber bonded to the aluminum mandrel.

Employing finite element analysis, the inventors have found that the STDC per meter can be varied from the hard bound value (1.95 DHCM) for the polymer-jacketed fiber to approximately the free value (0.09 DHCM) by employing any one or combination of the following methods:

1. Employing an adhesive of lesser stiffness (i.e. Young's modulus, E) than that of the coil potting adhesive;
2. Increasing the thickness of the adhesive layer between the bonded fiber and the mandrel to which it is hard bonded; and
3. Bonding the coil leads to regions of the coil that possess different strain coefficients.

By selectively employing the above insights it is possible to achieve zero Shupe coefficient without adjusting lead lengths as taught by the above United States patent. In essence, the thermal stress environment of the coil leads is manipulated (without changing lead lengths) to contribute a net STDC that is of approximately equal magnitude and opposite sign to that of the coil pack.

The existence of a temperature-dependent strain differential between the CW and CCW-wound fiber segments comprising the coil pack introduces a temperature-dependent Shupe bias into the gyro output. Such a differential strain can arise from many different sources. For example, in a quadrupole-wound coil, winding imperfections can lead to such a differential as the strain field varies nonlinearly with radius within the wound coil, producing a nonuniform strain field. Other factors, including the temperature-dependent expansion of glass, the thermally-induced expansion of potting material and spool or coil mount-induced stresses can further introduce temperature-dependent factors that will affect Shupe bias.

The method of the invention is generally implemented by first measuring Shupe bias in output by a potted coil or coil pack in response to a number of thermal ramps. Such bias is characterized by both a sign and a magnitude. The sign indicates in which half of the wound coil (CW or CCW) the thermally-induced strain is predominant (i.e. of greater magnitude). The coil designer may then select, in an analytical manner, the design of the lead interface by applying one or more of the three factors or principles listed above.

Figure 4:
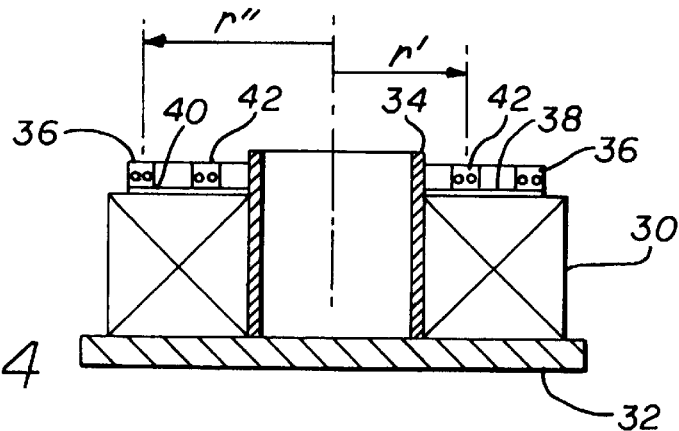
FIGS. 4 through 7 are a series of cross sectional views of a wound coil pack including lead arrangements in accordance with various embodiments of the invention.

FIG. 4 is a cross-sectional view of a toroidal coil pack 30 which is fixed to a coil mount comprising a flange 32 and a central hub 34. This figure provides an illustration of coil leads arranged to reduce Shupe bias in gyro output in accordance with principle "3" above.

Referring to FIG. 4, it is noted that multiple turns of a fiber lead 36 that has been spliced to the CW windings of the coil pack 30 are bonded to the top surface 38 of the coil pack 30 by means of an adhesive 40 a radial distance r' from the central axis 41 of the hub 34. Similarly, turns of a fiber lead 42 engaged to the terminus CCW windings of the coil pack 30 are fixed by an adhesive 44 to the top surface of the coil pack at a lesser distance r" from the axis 41 of the hub 34.

From finite element analysis, it is known that the inner radius $r_1$ of a coil pack contracts about 30 ppm/deg C and the outer radius or rim $r_2$ expands at about 30 ppm/deg C. Between the inner and outer radii the expansion (glass strain) coefficient closely resembles a cubic equation in radius:

$$d\epsilon/dT = 30 \times 10^{-6}(r - \langle r \rangle)^3/((r_2 - r_1)/2)^3 \qquad (1)$$

where $\epsilon$ is the optical path length strain, T is temperature, r is the radius of the part of the coil in question and $\langle r \rangle = (r_1 + r_2)/2$.

As shown in FIG. 4, the bottom of the coil pack 30 is mounted to the flange 32, leaving the top 38 of the coil 30, where the strain coefficient varies with r, available as a bonding surface. The radial distance between r' and r" thereby operates in accordance with principle 3 above to provide a means, by properly arranging the CW and CCW leads, for counteracting temperature-induced strain within the coil pack 30 to thereby reduce Shupe bias. Assuming that the CW and CCW leads are each two meters in length, the potential exists for cancelling about 10 deg/Hr/(deg C./min) of Shupe Tdot coefficient by bonding the CW and CCW leads to the top 38 of the coil pack 30 adjacent the hub 34 and the coil rim respectively (or vice versa depending upon which direction of winding is subject to greater strain).

While FIG. 4 illustrates the reduction of Shupe bias in accordance with principle 3 and is satisfactory for use in the presence of constant temperature ramp rates, when temperature ramp rates are changing a different type of transient Shupe bias, known as Shupe Tdotdot Bias ("STDDB", bias error as a function of rate of change of temperature ramp $\ddot{T}$) must be addressed. This is due, in part, to gradient-dependent temperature differences that develop between the CW and CCW lead-bonding locations. To reduce STDDB, the CCW and CW leads should be bonded as physically close to one another as practical. If, for other reasons, the CW and CCW leads cannot be bonded in close proximity, then the leads can still be tied together thermally by employing a bonding compound of high thermal conductivity.

Figure 5:
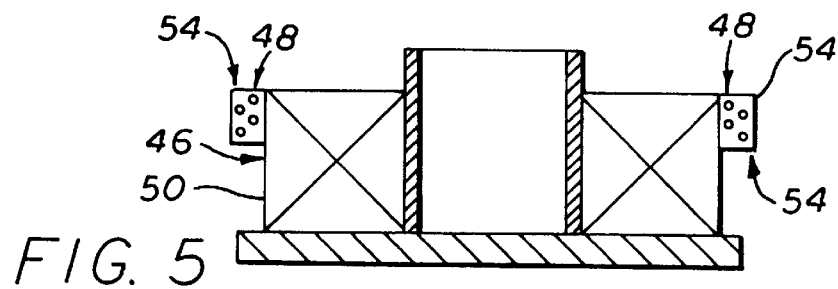
Figure 6:
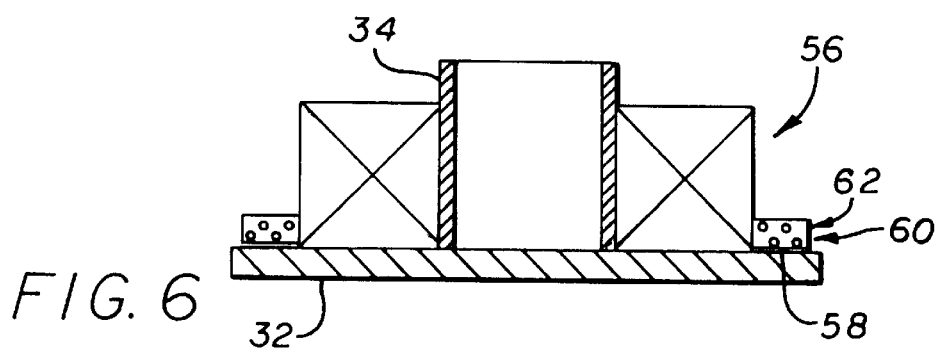
Figure 7:
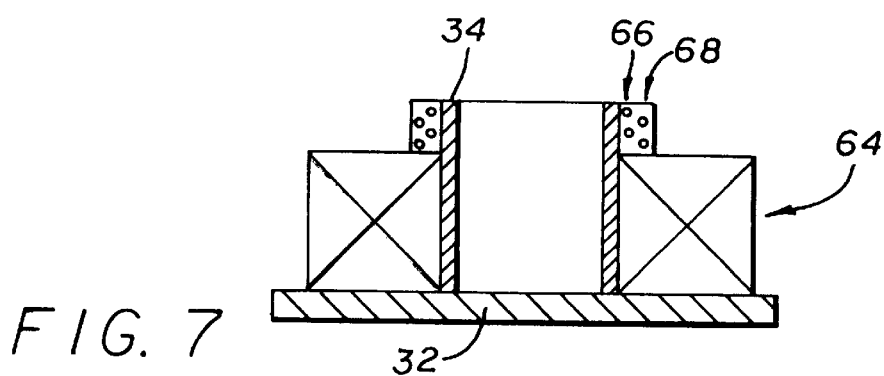

FIGS. 5 through 7 illustrate arrangements in accordance with the invention for addressing the problems associated with non-consistent temperature ramp rates. Each of such configurations relies upon one or more of principles "1" and "2" discussed above. In FIG. 5, a coil pack 46 is again supported by a mount including a bottom flange 32 and a central hub 34. In accordance with principle "1" (and principle "2"), a thermally-induced stress for counteracting the thermally-induced differential strain within the coil pack 46 that would otherwise produce Shupe bias, is produced by bonding, for example, the turns of a CW lead 48 adjacent the outer rim 50 of the coil pack 46 by means of a softer adhesive (i.e. softer than the adhesive potting material of the coil pack 46). Material 52 encapsulates the turns of a CCW lead 54 at a distance removed from the rim 50 of the coil pack 46. In this way, the CCW lead 54 is bonded by means of an adhesive layer having effectively lower stiffness than the adhesive layer to which the CW lead 48 is fixed. Of course, it will be appreciated that the specific arrangement referred to is appropriate for use with a coil pack 46 which, upon testing, exhibits a thermally-induced Shupe bias resulting from thermally-induced strain in its CCW windings exceeding that in its CW windings (in FIG. 5, the CW lead 48 is subject to greater thermal stress than the CCW lead 54). Should the character of the coil pack 46 differ, the positions of the CW and CCW leads would be reversed.

In accordance with principle 2 above, a greater stress differential for counteracting the strain differential within the coil pack 46 may be obtained by increasing the thickness of the adhesive bonding material 52 whereby the radial distance between the CW and CCW lead windings is increased (refer to FIG. 5). Alternatively, an adhesive material of softer character (i.e. lower Young's modulus) may also be employed to enhance the possible stress differential for counteracting thermally-induced strain.

FIG. 6 is a cross-sectional view of a mounted coil pack 56 in which the CW and CCW leads are fixed to the flange 32 by means of an adhesive 58 as shown, the turns of the CCW lead 60 contact the upper surface of the flange 32 while the turns of the CW lead 62 are spaced therefrom by the relatively-soft adhesive 58. Again, the relative positions of the CW and CCW leads depend upon the measured strain or STDC within the coil pack 56. The turns of the lead that lies adjacent to the very stiff metal of the flange 32 will be stressed more than the turns of the lead which are remote and encapsulated in the adhesive 58. The calibration of the cancellation lead design will, of course, depend on the coefficient of thermal expansion of the metal to which the turns of the lead 60 are fixed. The metal wrapping technique, since both leads are wrapped on a relatively good conductor, would probably induce the lowest STDDB bias.

In FIG. 7, the CW and CCW leads 66 and 68 respectively are again mounted not to the coil pack 64 but to the metal hub 34 in a manner consistent with principles 1 and 2. The analysis of this arrangement follows from the discussion of FIG. 6 above.

While the foregoing alternative designs have been described with reference to the use of a single adhesive bonding material for both CW and CCW leads, it will be readily appreciated that one may enhance the differential stress obtained through the careful selection and anchoring of leads, for example, by bonding the turns of the lead closest to the coil pack (or to the flange or hub of the coil mount) with a first adhesive (presumably of higher Young's modulus) and bonding the other lead by means of a second adhesive of different (presumably lower) Young's modulus. Similarly, with reference to the embodiment of FIG. 4, the leads fixed at differing radial distances from the center of the hub 34 may be affixed to the top of the coil pack 36 by means of differing adhesives. Likewise, the amount of Shupe cancellation achieved may be very finely graded by means of just two adhesives. This can be accomplished by bonding a predetermined fraction of, for example, the CW lead with the "stiff" adhesive and the remainder with the "soft" adhesive and then bonding the entire CCW lead with the stiff adhesive.

Thus, it is seen that the present invention provides a method and apparatus for substantially reducing the temperature-dependent Shupe bias of the output of a gyro incorporating a sensor coil in accordance with the invention. By employing the teachings of this invention, one has access to a very large variety of combinations of lead locations, adhesives and manners of affixation for adjusting the differential stress input to counteract a strain imbalance within the coil pack and thereby produce an output signal substantially unaffected by Shupe bias.

While this invention has been described with reference to its presently-preferred embodiment, it is not limited thereto. Rather, this invention is limited only insofar as it is defined by the following set of patent claims and includes within its scope all equivalents thereof.

What is claimed is:

1. A method for reducing Shupe bias in a fiber optic gyroscope of the type that includes a source of optical energy, a coil pack comprising a potted sensor coil formed of fiber segments wound clockwise and counterclockwise from the midpoint of said coil, said coil pack being located upon and adjacent to a coil mount, a phase modulator engaged to said coil for imposing an artificial phase shift upon light counterpropagating within said coil and a photodetector for receiving and converting the output of said coil into an electrical signal, said method including the steps of:

a) applying a plurality of temperature ramps to said coil pack; and b) measuring the output of said coil in response to each of said temperature ramps; then c) calculating the strain differential between the clockwise and counterclockwise-wound fiber segments; then d) determining a coil lead profile for imposing a counteracting differential stress; and then e) attaching fiber leads to the ends of said clockwise and counterclockwise wound fiber segments in accordance with said lead profile.

2. A method as defined in claim 1 wherein the step of determining a lead profile further includes the step of determining an adhesive for securing at least one of said leads.

3. A method as defined in claim 2 wherein the step of determining a lead profile further includes the step of determining the thickness of said adhesive.

4. A method as defined in claim 3 wherein the step of attaching further includes the step of attaching at least one of said leads to said coil mount by means of said adhesive.

5. A method as defined in claim 1 wherein the step of determining a lead profile further includes the step of determining the variation of strain coefficient by region of said coil pack.

6. A method as defined in claim 5 wherein the step of attaching leads further comprises the step of attaching said leads to differing regions of said coil pack so that the resultant stress differential thereby created is equal and opposite to said strain differential between said clockwise and counterclockwise-wound fiber segments.

7. A mounted sensor coil for a fiber optic gyroscope comprising, in combination:
   a) an optical fiber;
   b) said fiber being arranged into a plurality of layers of clockwise and counterclockwise turns from the midpoint of said fiber in accordance with a predetermined winding pattern;
   c) said plurality of layers of turns being potted with a first adhesive to form a coil pack;
   d) said coil pack being located upon and adjacent to a coil mount comprising a central hub and at least one end flange to thereby form a mounted arrangement;
   e) fiber leads fixed to the opposed ends of said wound fiber; and
   f) said leads being bonded to predetermined regions of said mounted arrangement.

8. A mounted sensor coil as defined in claim 7 wherein said regions are characterized by a predetermined stress differential.

9. A mounted sensor coil as defined in claim 8 wherein:
   a) said coil pack is characterized by an internal strain differential between said clockwise and counterclockwise wound portions of said fiber; and
   b) said predetermined stress differential is equal and opposite to said internal strain differential.

10. A mounted sensor coil as defined in claim 7 further comprising:
    a) a second adhesive;
    b) said leads being bonded to said coil pack by means of said second adhesive; and
    c) said leads being bonded to said coil pack so that one of said leads is separated from said coil pack by differing thicknesses of said second adhesive.

11. A mounted sensor coil as defined in claim 10 wherein:
    a) said coil pack is characterized by an internal strain differential between said clockwise and said counterclockwise wound portions of said fiber; and
    b) said second adhesive and said thickness are such that said bonded leads produce a net stress differential that is equal in magnitude and opposite in sign to said internal strain differential.

12. A mounted sensor coil as defined in claim 7 further comprising:
    a) said leads being bonded by means of a second adhesive;
    b) said leads being affixed adjacent one another; and
    c) one of said leads being affixed adjacent said coil mount.

13. A mounted sensor coil as defined in claim 12 wherein:
    a) said coil pack is characterized by an internal strain differential between said clockwise and counterclockwise-wound portions of said fiber; and
    b) said second adhesive and the relative proximities of said fiber leads to said coil mount are such that said bonded leads produce a net stress differential that is equal in magnitude and opposite in sign to said internal strain differential.

14. A mounted sensor coil as defined in claim 13 wherein said fiber leads are bonded adjacent said flange of said coil mount.

15. A mounted sensor coil as defined in claim 13 wherein said fiber leads are bonded adjacent said hub of said coil mount.

\* \* \* \* \*